US012327950B2

(12) United States Patent
Kawai et al.

(10) Patent No.: US 12,327,950 B2
(45) Date of Patent: Jun. 10, 2025

(54) MALE CONNECTOR AND CONNECTOR ASSEMBLY

(71) Applicant: SUMITOMO WIRING SYSTEMS, LTD., Mie (JP)

(72) Inventors: Kohei Kawai, Mie (JP); Akihiro Kon, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 456 days.

(21) Appl. No.: 17/949,428

(22) Filed: Sep. 21, 2022

(65) Prior Publication Data

US 2023/0093051 A1 Mar. 23, 2023

(30) Foreign Application Priority Data

Sep. 22, 2021 (JP) ................................ 2021-154204

(51) Int. Cl.

*H01R 13/631* (2006.01)
*H01R 13/447* (2006.01)
*H01R 13/627* (2006.01)

(52) U.S. Cl.

CPC ......... *H01R 13/631* (2013.01); *H01R 13/447* (2013.01); *H01R 13/6272* (2013.01)

(58) Field of Classification Search

CPC ................ H01R 13/631; H01R 13/447; H01R 13/6272; H01R 13/4223; H01R 13/426; H01R 13/64; H01R 2101/00

See application file for complete search history.

(56) References Cited

U.S. PATENT DOCUMENTS

| | | | | | |
|---|---|---|---|---|---|
| 9,954,302 | B2 * | 4/2018 | Kamei | H01R 13/18 | |
| 2003/0096528 | A1 * | 5/2003 | Fukamachi | H01R 13/6456 | 439/378 |
| 2010/0075531 | A1 * | 3/2010 | Beck | H01R 12/718 | 439/405 |
| 2016/0056565 | A1 * | 2/2016 | Yamada | H01R 13/5202 | 439/521 |
| 2016/0190726 | A1 * | 6/2016 | Kamei | H01R 13/502 | 439/660 |
| 2018/0226748 | A1 * | 8/2018 | Hayasaka | H01R 13/6272 | |
| 2020/0287323 | A1 * | 9/2020 | Lee | H01R 13/642 | |
| 2023/0093051 | A1 * | 3/2023 | Kawai | H01R 13/6272 | 439/157 |
| 2023/0101726 | A1 * | 3/2023 | Kawai | H01R 43/048 | 29/752 |

FOREIGN PATENT DOCUMENTS

JP 2011-198593 A 10/2011

* cited by examiner

*Primary Examiner* — Abdullah A Riyami
*Assistant Examiner* — Nader J Alhawamdeh
(74) *Attorney, Agent, or Firm* — Venjuris, P.C.

(57) ABSTRACT

Provided is a male connector capable of easily engaging with a female connector. A male connector 10 includes a hood portion 13 with a cylindrical shape that is fit into, from a projecting end 13A side, an engagement cylindrical portion 23 formed as an opening of a female connector 20, wherein the hood portion 13 is provided with the at least one guide projection portion 31 projecting forward beyond the projecting end 13A with an annular shape.

5 Claims, 11 Drawing Sheets

MALE CONNECTOR AND CONNECTOR ASSEMBLY

CROSS-REFERENCE TO RELATED APPLICATIONS

This application is based on and claims priority from Japanese Patent Application No. 2021-154204, filed on Sep. 22, 2021, with the Japan Patent Office, the disclosure of which is incorporated herein in its entirety by reference.

TECHNICAL FIELD

The technology of the present specification relates to a male connector and a connector assembly.

BACKGROUND

A known electrical connector is described in Japanese Patent Laid-open Publication No. 2011-198593. The electrical connector is provided with a plug connector (male connector) including an engagement portion (hood portion) projecting to one side and a receptacle connector (female connector) formed with an engagement opening (engagement cylindrical portion) that receives and houses the engagement portion. The engagement portion of the plug connector is inserted in the engagement opening of the receptacle connector from the projecting end side and engaged with the engagement opening.

SUMMARY

With electrical connectors such as that described in Japanese Patent Laid-open Publication No. 2011-198593, the connector may be small and there may be not enough work space, making inserting the engagement portion in the engagement opening take a long time. To avoid such an issue, for example, a conceivable configuration includes a connector assembly with a frame attached to a female connector in which a front wall with a tapered surface is disposed on the frame on the front of an engagement cylindrical portion of the female connector, where this front wall of the frame guides the hood portion of the male connector into the engagement cylindrical portion of the female connector. However, with such a configuration in which the hood portion and the engagement cylindrical portion are formed with a shape that conforms to the external shape of the terminals housed therein, when terminals with different external shapes are used, the shape of the male connector and the female connector as well as the shape of the frame including the front wall must be changed. Thus, there is a demand for a male connector capable of easily guiding a hood portion into a female connector engagement cylindrical portion without the use of another member.

The technology disclosed in the present specification has been completed in light of the circumstances described above and is directed at providing a male connector that can easily engage with a female connector and a connector assembly provided with the same.

A male connector disclosed in the present specification includes a hood portion with a cylindrical shape that is fit into, from a projecting end side, an engagement cylindrical portion formed as an opening on a female connector, wherein the hood portion is provided with at least one guide projection portion projecting forward beyond the projecting end with an annular shape.

Also, a connector assembly disclosed in the present specification includes the male connector according to the present disclosure; and a female connector including an engagement cylindrical portion with a cylindrical shape that the hood portion fits into, wherein an inner circumferential surface of the engagement cylindrical portion is provided with a recess portion that receives and houses the guide projection portion of the male connector.

According to the present disclosure, provided is a male connector that can easily engage with a female connector and a connector assembly provided with the same.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
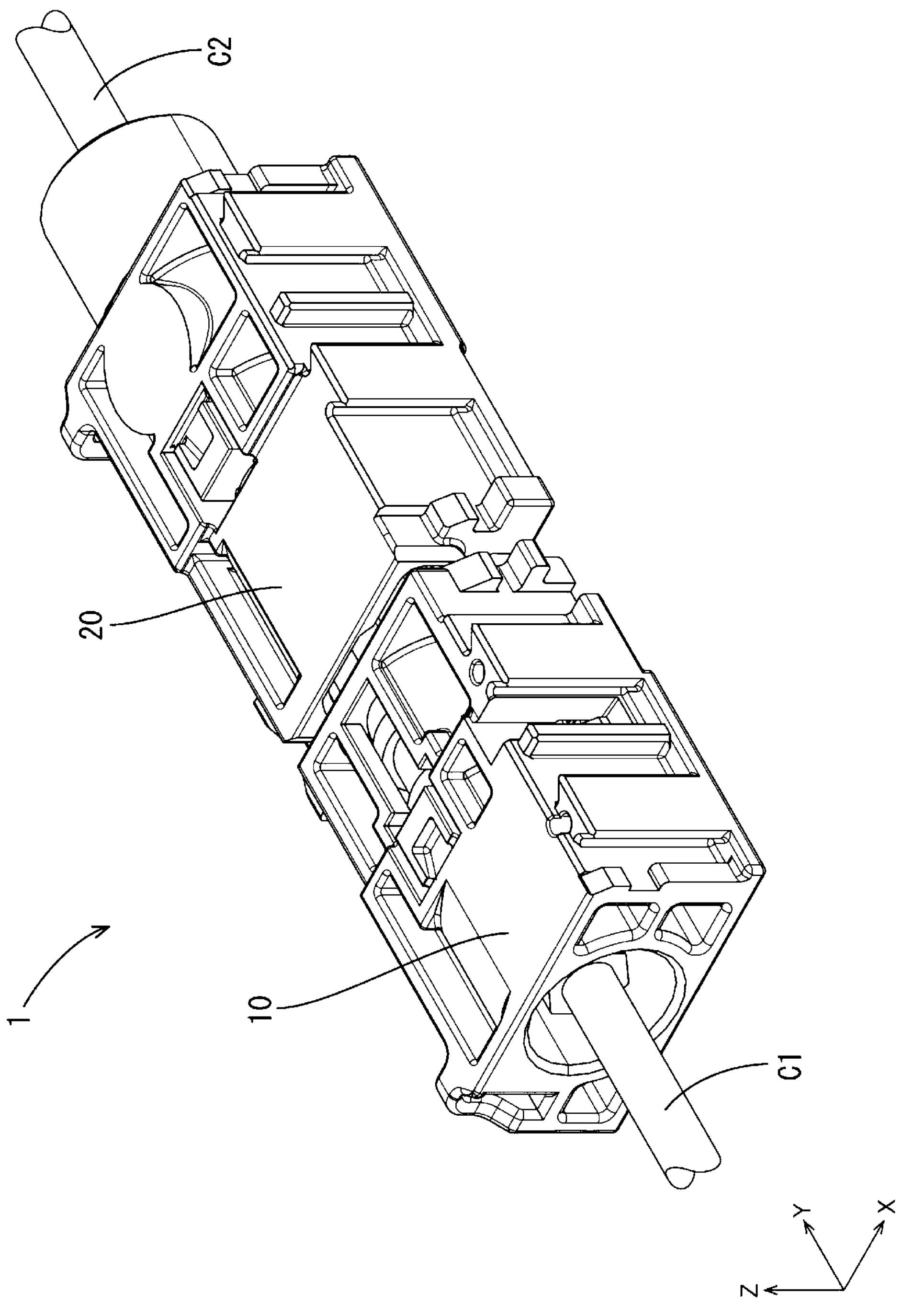
FIG. 1 is a perspective view illustrating the appearance of a connector assembly (in an engaged state) according to an embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

DESCRIPTION OF EMBODIMENTS

Firstly, embodiments of the present disclosure will be listed and described.

(1) A male connector according to the present disclosure includes a hood portion with a cylindrical shape that is fit into, from a projecting end side, an engagement cylindrical portion formed as an opening on a female connector, wherein the hood portion is provided with at least one guide projection portion projecting forward beyond the projecting end with an annular shape.

According to the configuration (1) described above, the hood portion is guided into the engagement cylindrical portion by the guide projection portion, enabling easy engagement. Also, by adjusting the projection length of the guide projection portion, the guide length can be discretionarily set. Because guiding can be performed without using another member of the connector assembly, with the provided connector assembly, terminals with different shapes can be used in the connector assembly by just changing the shape of the male connector and the female connector.

(2) In the male connector according to the present disclosure, preferably an outer circumferential surface of the hood portion is provided with a rib extending in a projection direction of the hood portion; and the guide projection portion is formed on a front end of the rib.

According to the configuration (2) described above, because of the rib, the strength of the hood portion is improved and the hood portion can be smoothly and easily inserted into the engagement cylindrical portion to the back.

(3) In the male connector according to the present disclosure, preferably the hood portion includes a predetermined thickness portion formed with a predetermined wall thickness and a thin portion formed with a wall thickness less than that of the predetermined thickness portion; and the rib is disposed at a position adjacent to the thin portion.

According to the configuration (3) described above, the rib reinforces the region near the thin portion which is less strong than the predetermined thickness portion. As a result, the male connector can be made compact, allowing the connector assembly to be made compact.

(4) A connector assembly according to the present disclosure includes the male connector according to the present disclosure; and a female connector including an engagement cylindrical portion with a cylindrical shape that the hood portion fits into, wherein an inner circumferential surface of the engagement cylindrical portion is provided with a recess portion that receives and houses the guide projection portion of the male connector.

According to configuration (4) described above, by adjusting the depth of the recess portion and the projection length of the guide projection portion, the dimensions of the connector assembly when engaged can be made as small as possible. Also, incorrect connection can be prevented by appropriately designing various connectors in terms of the position, shape, and dimensions of the guide projection portion and the recess portion.

(5) A connector assembly according to the present disclosure includes the male connector according to the present disclosure; and a female connector including an engagement cylindrical portion with a cylindrical shape that the hood portion fits into, wherein an inner circumferential surface of the engagement cylindrical portion is provided with a recess portion that receives and houses the guide projection portion of the male connector and a groove portion that receives and houses the rib.

According to the configuration (5) described above, the groove portion formed on the inner circumference side surface of the engagement cylindrical portion functions as a guide, allowing the hood portion provided with the rib to be smoothly guided to the back of the engagement cylindrical portion.

(6) In the connector assembly according to the present disclosure, preferably a tapered surface is formed on a distal end of the guide projection portion and an opening end of the engagement cylindrical portion.

According to the configuration (6) described above, because of the tapered surfaces, the guide projection portion can be smoothly guided into the engagement cylindrical portion. According to the configuration in which the groove portion is provided on the engagement cylindrical portion, because of the tapered surfaces, the guide projection portion can be guided into the groove portion.

(7) In the connector assembly according to the present disclosure, preferably the female connector includes a lance capable of bending and deforming that stops a terminal housed inside the engagement cylindrical portion; and the groove portion is disposed in a region near the lance when viewed from the front.

According to the configuration (7) described above, because the recess portion is disposed at a portion of the female connector with a relatively high strength, the effects of a decrease in strength due to the recess portion are kept small.

Detailed Description of Embodiments

Embodiments of the present disclosure will be described below. The present invention is not limited to these examples and is defined by the scope of the claims, and intended to include all modifications that are equivalent to or within the scope of the claims.

Embodiments

An embodiment will be described with reference to FIGS. 1 to 9C.

Figure 2:
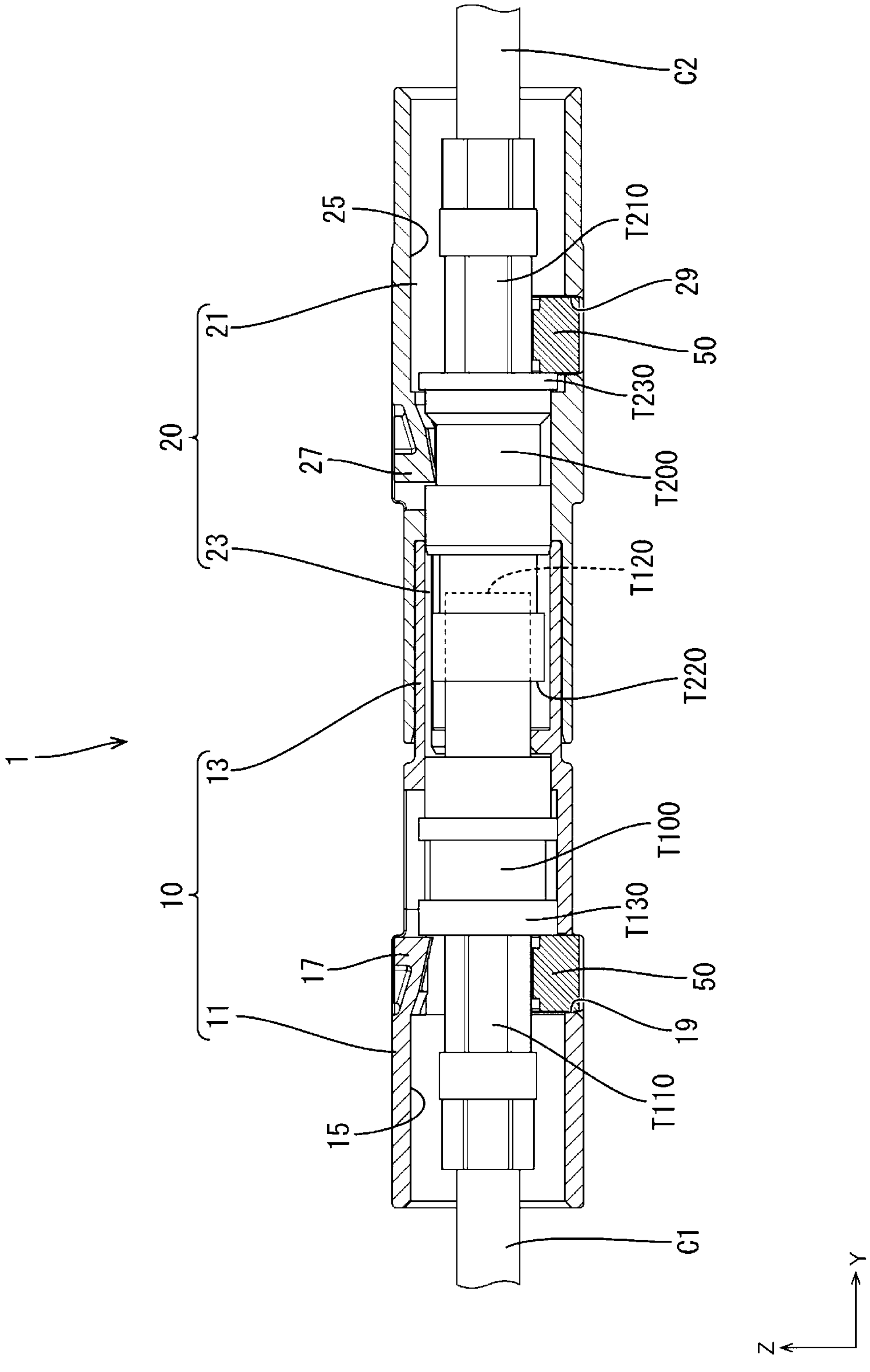
FIG. 2 is a side cross-sectional view illustrating the inside of the connector assembly (in an engaged state).
Figure 4:
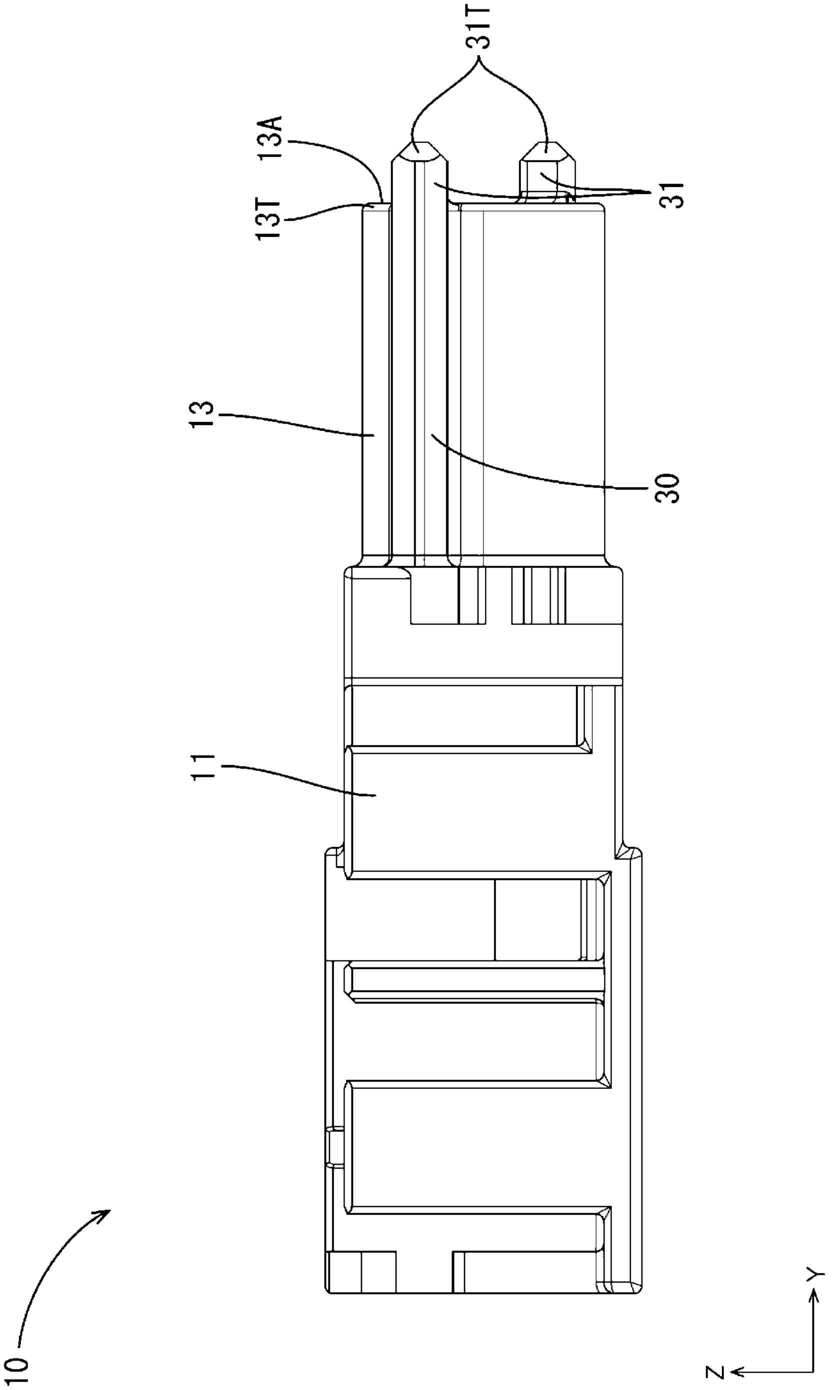
FIG. 4 is a side view of the male connector.
Figure 7:
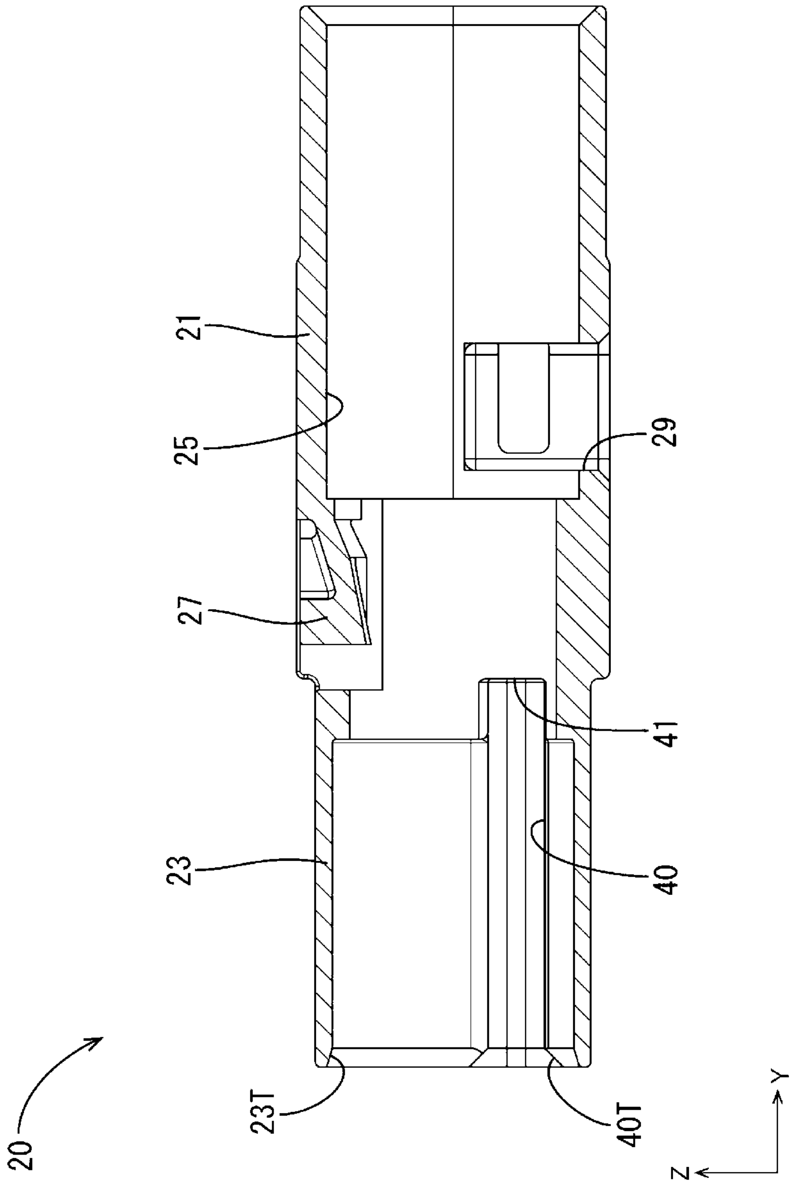
FIG. 7 is a side cross-sectional view of the female connector.

In the present disclosure, the side where a male connector and female connector face one another, that is, the right side for the male connector in FIG. 4 and the left side for the female connector in FIG. 7, is defined as the front (and the opposite side is defined as the back). Also, hereinafter, the upper side in FIG. 2 is defined as up (and the opposite side defined as down), but connectors and the connector assembly may be used in any orientation. In one or more diagrams, the X axis, the Y axis, and the Z axis of a Cartesian coordinate system XYZ are indicated, and the direction of these axial directions are consistent across the diagrams. The Z-axis direction represents the up-and-down direction, the Y-axis direction represents the front-and-back direction, and the X-axis direction represents the left-and-right direction. Note that for members including a plurality of members, a reference sign or number may only be given to one or more of the members of the plurality and not given to other members.

Connector Assembly

As illustrated in FIG. 1, a connector assembly 1 is provided with a male connector 10 and a female connector 20. As illustrated in FIG. 2, the male connector 10 houses a first terminal T100 connected to a terminal of a cable C1, and the female connector 20 houses a second terminal T200 connected to a terminal of a cable C2. Though not illustrated, the connector assembly 1 further includes a male frame that holds the male connector 10 and a female frame that holds the female connector 20. A lock structure provided on the male frame and the female frame allows the male connector 10 and the female connector 20 to be maintained in an engaged state.

Cable and Terminal

For example, a coaxial cable provided with an inner conductor, a dielectric disposed around the outer circumference of the inner conductor, an outer conductor including a braided wire or the like disposed around the outer circumference of the dielectric, and an insulator covering that outer circumference of the outer conductor may be used for the cables C1 and C2. A coaxial terminal that connects to a terminal-processed coaxial cable is provided with, for example, a center contact that connects to the inner conductor, an insulator that holds the center contact, an outer contact that holds the insulator, and a metal sleeve that is compression-bonded to the outer conductor.

As illustrated in FIG. 2, in the present embodiment, the first terminal T100 and the second terminal T200 are coaxial terminals, for example, each including a base end portion T110, T210 compression-bonded to the cable C1, C2 at the base end side, a distal end portion T120, T220 with a cylindrical shape that engages with the counterpart terminal at the distal end side, and a collar portion T130, T230 located between the base end portion T110, T210 and the distal end portion T120, T220 that projects in the outer circumferential direction. The distal end portion T220 of the second terminal T200 is formed in a manner so that it engages substantially tightly with the outer circumference side of the distal end portion T120 of the first terminal T100. When the male connector 10 that houses the first terminal T100 in a regular position and the female connector 20 that houses the second terminal T200 in a regular position are engaged together, as illustrated in FIG. 2, the distal end portion T120 of the first terminal T100 is fitted into the distal end portion T220 of the second terminal T200, the center contacts held inside the distal end portions T120 and T220 come into contact with one another, and the terminals T100 and T200 are electrically connected.

Male Connector

Figure 3:
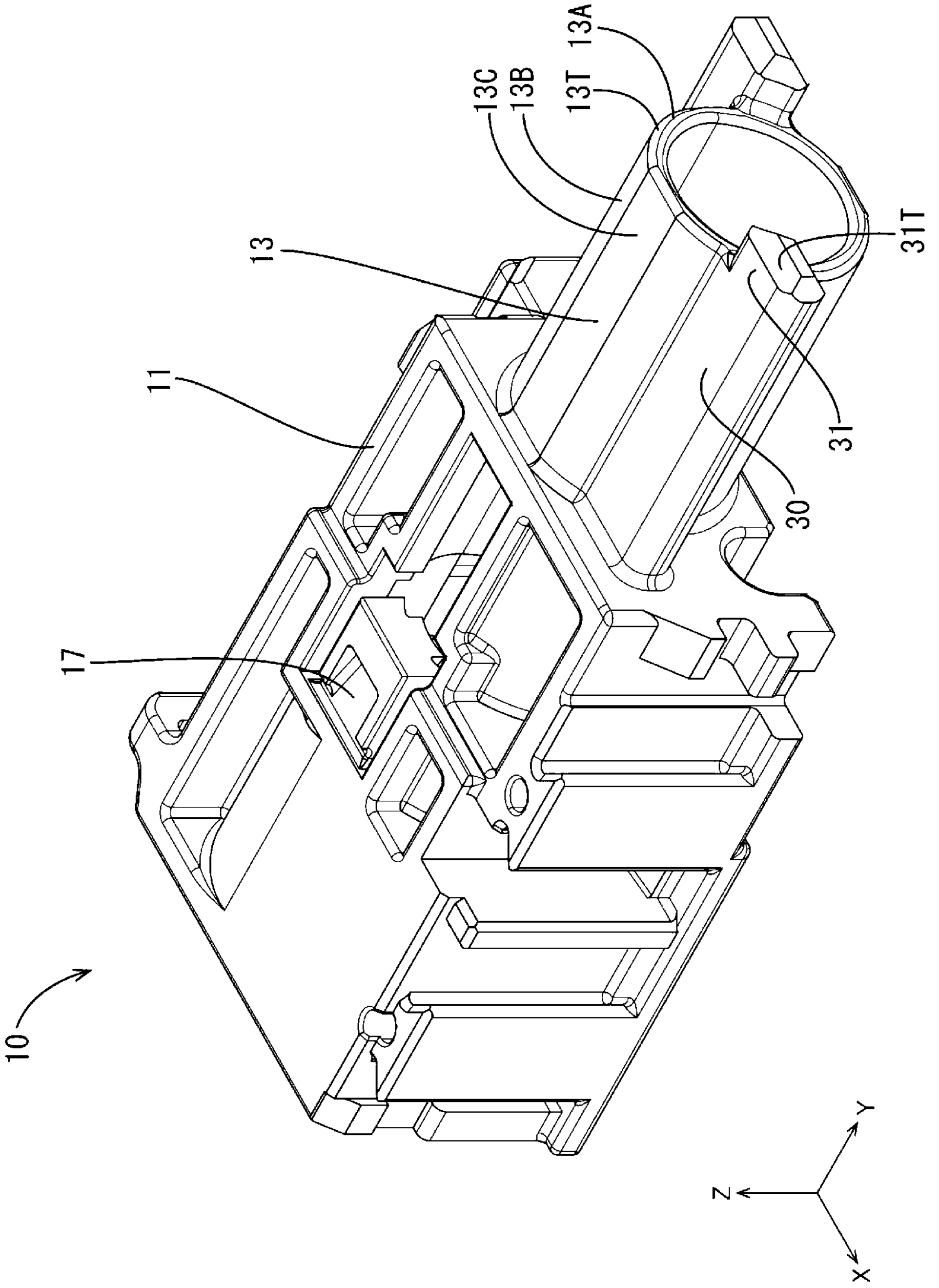
FIG. 3 is a perspective view of a male connector.
Figure 5:
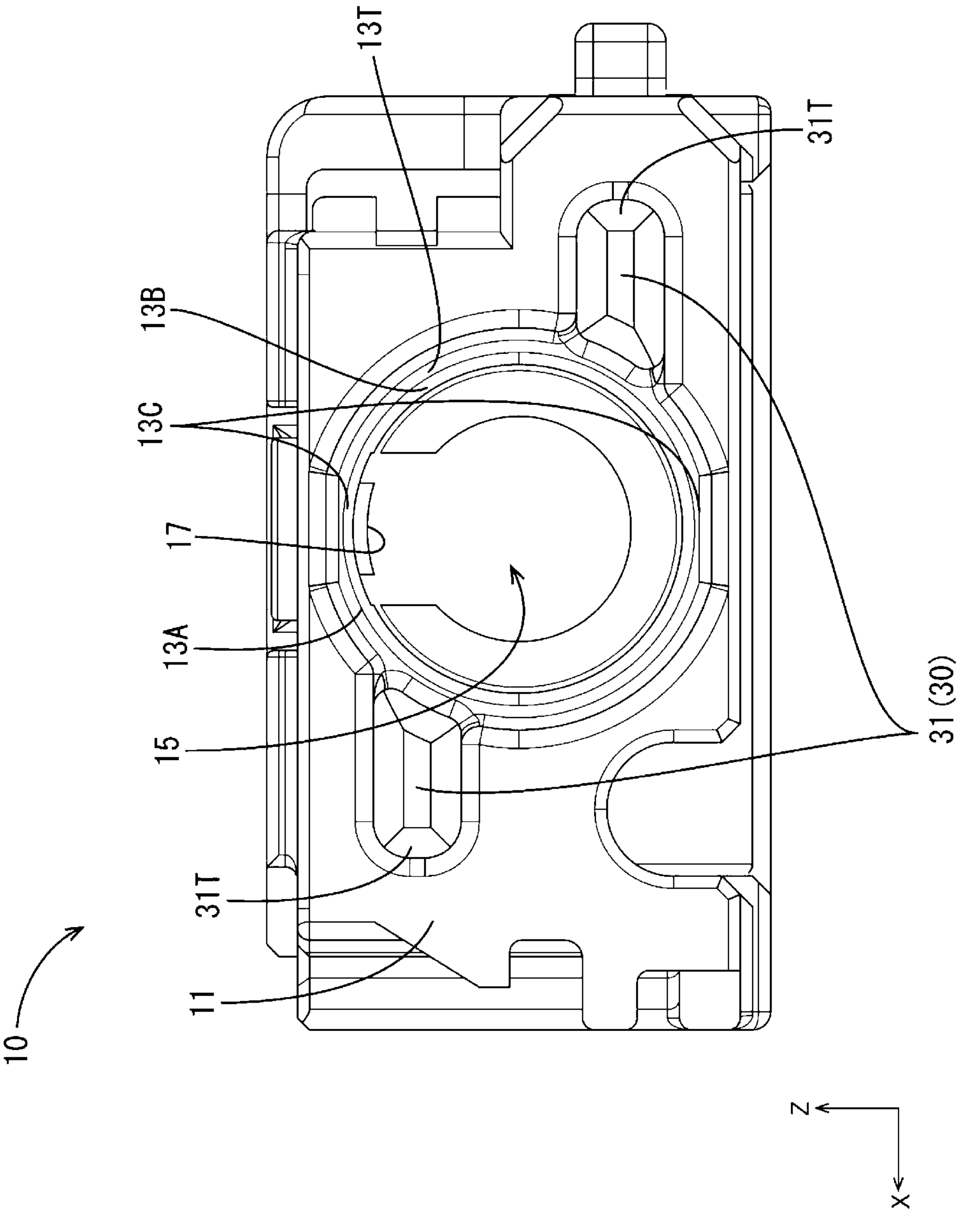
FIG. 5 is a view of a front surface (engagement surface) of the male connector.

As illustrated in FIGS. 3 to 5, the male connector 10 has a shape that includes a male side body portion 11 with an external shape that is roughly a rectangular parallelepiped and a hood portion 13 with a roughly cylindrical shape that projects from the front surface of the male side body portion 11 toward the front. As illustrated in FIG. 5, the male side body portion 11 has a rectangular shape with the short sides aligned with the up-and-down direction when viewed from the front surface. The male connector 10 can be an integrally molded member made of a synthetic resin with insulating properties, for example. As illustrated in FIG. 2, a male side terminal housing portion 15 with a circular cross-section is formed inside the male connector 10. The male side terminal housing portion 15 extends through the male side body portion 11 and the hood portion 13 in the front-and-back direction. The first terminal T100 connected to the terminal of the cable C1 is inserted inside the male side terminal housing portion 15 from the back side and housed therein.

As illustrated in FIG. 3 and the like, a male side lance 17 is formed on the upper face of the male side body portion 11 in a cantilever shape with the front end as the free end and is able to bend and deform in the up-and-down direction. The male side lance 17 is formed projecting inside the male side terminal housing portion 15 in the natural state (see FIG. 5). As illustrated in FIG. 2, when the first terminal T100 is inserted into the male side terminal housing portion 15 from the back and pushed into the regular position, the front surface of the male side lance 17 capable of bending and deforming in the up-and-down direction comes into contact with the back surface of the collar portion T130, thus restricting the movement to the back of the first terminal T100.

Figure 9A:
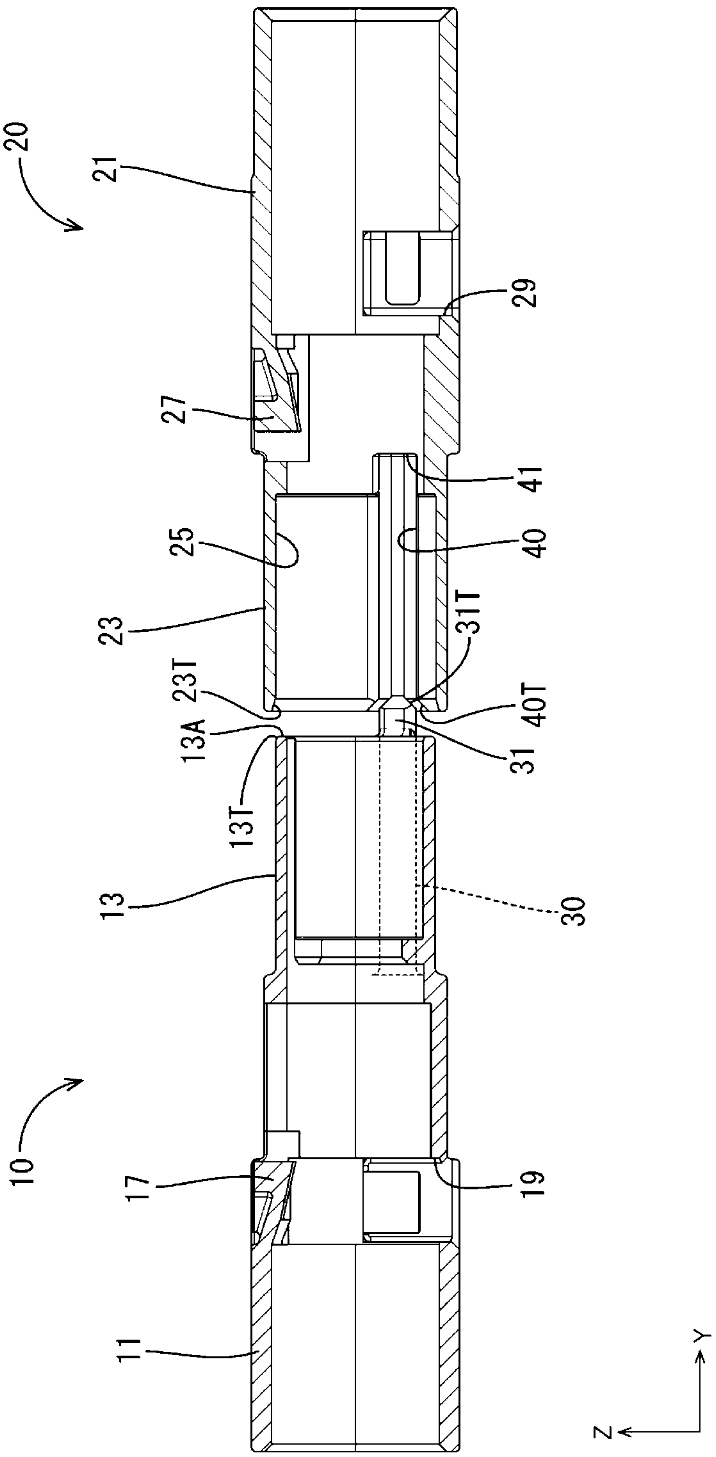
FIG. 9A is a side cross-sectional view illustrating the male connector and the female connector when being engaged.

A male side retainer mounting hole 19 is formed on the lower surface of the male side body portion 11 (see FIG. 9A). When the first terminal T100 is inserted into the male side terminal housing portion 15 from the back and a retainer 50 is inserted and mounted in the male side retainer mounting hole 19, the first terminal T100 is pushed in to the regular position and, as described above, stopped by a male side lance 25 and held inside the male side terminal housing portion 15.

Hood Portion

As illustrated in FIG. 3 and the like, the hood portion 13 has a roughly cylindrical shape and is formed projecting from the male side body portion 11 with the front-and-back direction (projection direction of the hood portion 13) as an axis. The cavity therein extending in the front-and-back direction forms a portion of the male side terminal housing portion 15, and a distal end portion of the first terminal T100 is housed inside the hood portion 13. The entirety of the hood portion 13 is substantially formed with a predetermined wall thickness that satisfies a strength requirement. As illustrated in FIG. 3 and the like, a projecting end tapered surface 13T that slants to the inner circumferential side as it extends to the front is provided on the outer circumferential surface of a projecting end 13A that forms the annular shape of the hood portion 13 opening to the front.

As illustrated in FIG. 5 and the like, the hood portion 13 with a circular shape when viewed from the front surface is formed extends, from the front surface of the male side body portion 11 with the short sides aligned with the up-and-down direction when viewed from the front surface, in a manner such that the opening diameter increases as much as possible, that is the dimension of the hood portion 13 in the up-and-down direction approaches the dimension of the male side body portion 11 in the up-and-down direction. Thus, of the wall portions forming the hood portion 13, the portions located on the upper portion and the lower portion correspond to thin portions 13C with a wall thickness less than a predetermined thickness portion 13B formed with a predetermined wall thickness. The thin portions 13C located at the upper portion and the lower portion of the hood portion 13 extend in the front-and-back direction (projection direction of the hood portion 13).

Rib and Guide Projection Portion

As illustrated in FIG. 3 and the like, a rib 30 that projects is disposed on the outer circumferential surface of the hood portion 13. Two ribs 30 are formed on the hood portion 13 according to the present embodiment. As illustrated in FIG. 5 and the like, in the region near the thin portions 13C, in other words at the outer circumferential surface of the hood portion 13, the rib 30 projects in the left-and-right direction (the direction of a tangent line of the center of the thin portions 13C when viewed from the front surface) from a position adjacent to the thin portions 13C and extends in the front-and-back direction (projection direction of the hood portion 13). As illustrated in FIG. 5, the two ribs 30 are provided at positions and with shapes that have point symmetry with respect to the center of the hood portion 13 when viewed from the front.

As illustrated in FIG. 4 and the like, the front end of the rib 30 projects forward beyond the hood portion 13 and forms a guide projection portion 31. The projection length of the guide projection portion 31 from the hood portion 13 can be discretionarily adjusted depending on the dimensions, shape, use, and the like of the connector assembly. However, to allow the hood portion 13 to be smoothly guided into an engagement cylindrical portion 23, the projection length is preferably 1 mm or greater, for example. As illustrated in FIG. 4 and the like, the guide projection portion 31 is provided with a distal end tapered surface 31T on the outer circumferential surface of the distal end, giving the guide projection portion 31 a tapered shape. The guide projection portion 31 is preferably able to be displaced in the radial direction of the projecting end 13A.

Female Connector

Figure 6:
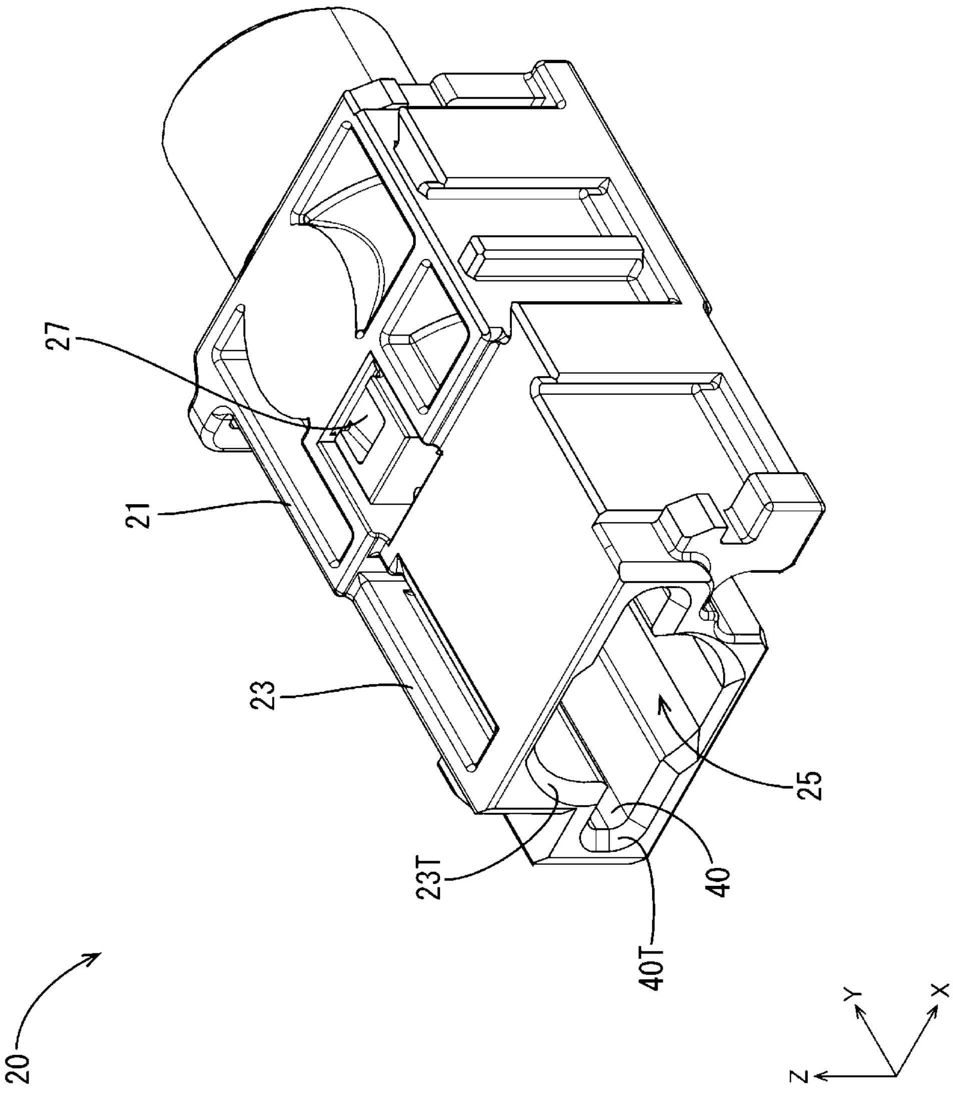
FIG. 6 is a perspective view of a female connector.
Figure 8:
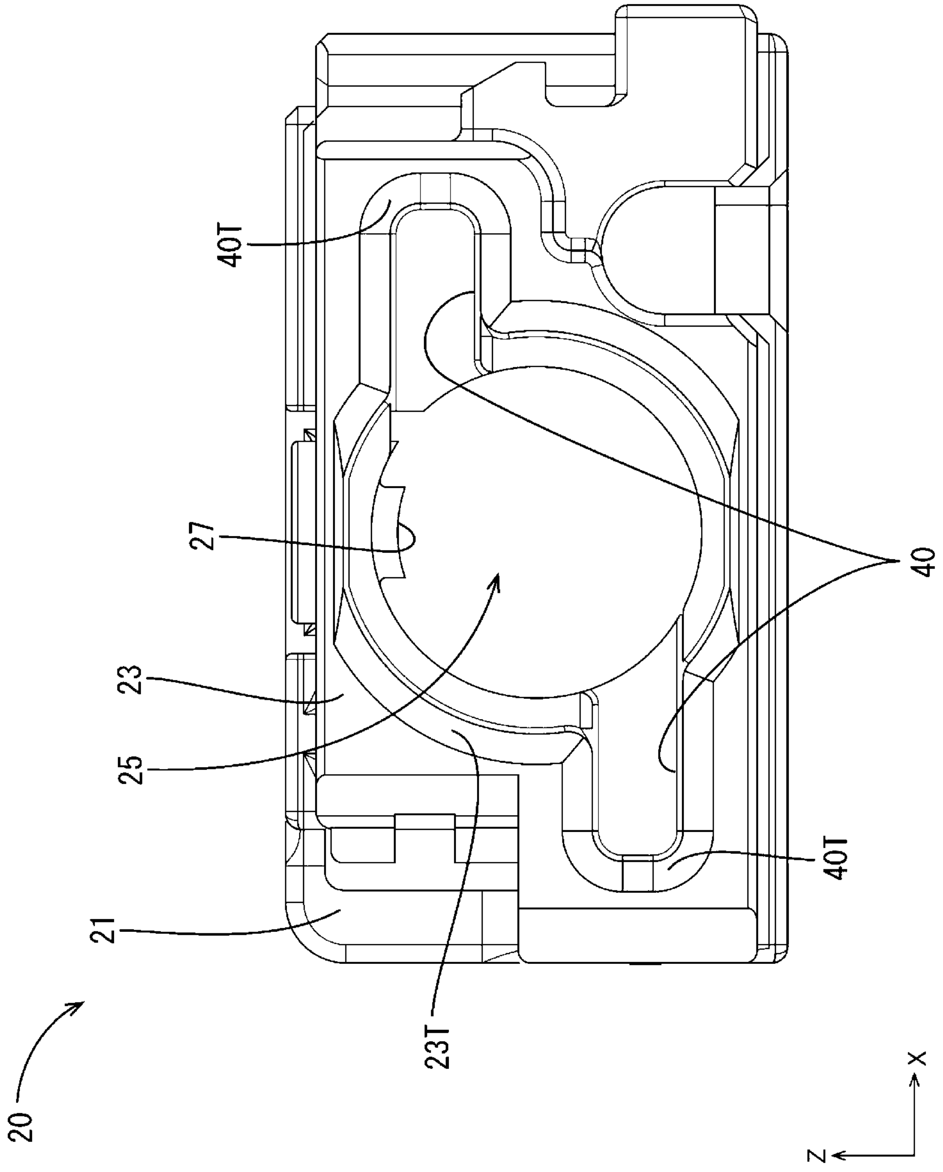
FIG. 8 is a view of a front surface (engagement surface) of the female connector.

As illustrated in FIGS. 6 to 8, the female connector 20 has a shape including a female side body portion 21 with a roughly rectangular parallelepiped external shape formed with a cylindrical projection portion at the back and an engagement cylindrical portion 23 with a roughly rectangular parallelepiped external shape that is slightly smaller overall than the female side body portion 21 provided at the front of the female side body portion 21. As illustrated in FIG. 8, the female side body portion 21 and a female side terminal housing portion 25 has a rectangular shape with the short sides aligned with the up-and-down direction when viewed from the front surface. The female connector 20 can be an integrally molded member made of a synthetic resin with insulating properties, for example. As illustrated in FIG. 2, the female side terminal housing portion 25 with a circular cross-section is formed inside the female connector 20. The female side terminal housing portion 25 extends through the female side body portion 21 and the engagement cylindrical portion 23 in the front-and-back direction. The second terminal T200 connected to the terminal of the cable C2 is inserted inside the female side terminal housing portion 25 from the back side and housed therein.

As illustrated in FIG. 7 and the like, the female side lance 27 is formed on the upper surface of the female side body portion 21 in a cantilever shape with the front end as the free end and is able to bend and deform in the up-and-down direction. The female side lance 27 is formed projecting inside the female side terminal housing portion 25 in the natural state (see FIG. 8). As illustrated in FIG. 2, when the second terminal T200 is inserted into the female side terminal housing portion 25 from the back and pushed into the regular position, the front surface of the female side lance 27 capable of bending and deforming in the up-and-down direction comes into contact with the back surface of the collar portion T230, thus restricting the movement to the back of the second terminal T200.

As illustrated in FIG. 7, a female side retainer mounting hole 29 is formed on the lower surface of the female side body portion 21. When the second terminal T200 is inserted into the female side terminal housing portion 25 from the back and the retainer 50 is inserted and mounted in the female side retainer mounting hole 29, the second terminal T200 is pushed in to the regular position and, as described above, stopped by the female side lance 27 and held inside the female side terminal housing portion 25.

Engagement Cylindrical Portion

As illustrated in FIG. 8 and the like, the engagement cylindrical portion 23 provided at the front of the female side body portion 21 opens to the front and has a rectangular shape with an external shape that is slightly smaller overall than the female side body portion 21 when viewed from the front surface. A cavity with a substantially circular cross-section that extends in the front-and-back direction is provided inside the engagement cylindrical portion 23, with the cavity forming a portion of the female side terminal housing portion 25. The inner circumference of the engagement cylindrical portion 23 is formed to engage substantially tightly with the outer circumference side of the hood portion 13 of the male connector 10 described above.

Groove Portion and Recess Portion

As illustrated in FIG. 6 and the like, a groove portion 40 is provided in the inner circumferential surface of the engagement cylindrical portion 23. The groove portion 40 extends in the front-and-back direction and receives and houses the guide projection portion 31 and the rib 30 of the male connector 10 described above. As illustrated in FIG. 8, the groove portion 40 is provided with the inner circumferential surface of the engagement cylindrical portion 23 recessed in the left-and-right direction (the direction parallel with the upper surface and the lower surface of the engagement cylindrical portion 23 and the female side body portion 21).

As illustrated in FIG. 7, the groove portion 40 extends backward beyond a portion of the inner circumference of the engagement cylindrical portion 23 that engages with the outer circumference of the hood portion 13, forming a recess portion 41. The extension length of the groove portion 40, in other words the depth of the recess portion 41, is set to match the projection length of the guide projection portion 31 or the like. However, the length is preferably enough to comfortably receive and house the guide projection portion 31.

As illustrated in FIG. 8 and the like, in the present embodiment, two groove portions 40 are provided corresponding to the two ribs 30 of the male connector 10. The two groove portions 40 are provided at positions and with shapes that have point symmetry with respect to the center of the opening of the engagement cylindrical portion 23 when viewed from the front. One of the two groove portions 40 (the groove portion 40 illustrated on the upper right in FIG. 8) is provided at a position adjacent to the female side lance 27 when viewed from the front, and the recess portion 41 formed on the back end of the groove portion 40 is disposed in the region near the female side lance 27, in other words at a position near the female side lance 27.

As illustrated in FIG. 6 and the like, a cylindrical portion tapered surface 23T that slants to the inner circumferential side as it extends to the back is provided on the inner circumferential surface of the opening end of the front surface of the engagement cylindrical portion 23 including the groove portion 40. Hereinafter, regarding the cylindrical portion tapered surface 23T, the tapered surface provided on the opening end of the groove portion 40 is referred to as a groove portion tapered surface 40T.

Engagement of Male Connector and Female Connector

Next, the operation of engaging together the male connector 10 and the female connector 20 will be described with reference to FIGS. 9A to 9C. Note that in FIGS. 9A to 9C, to simplify the diagrams, the terminals T100 and T200 housed in the male connector 10 and the female connector 20 are omitted from the diagrams. However, in reality, the engagement operation is performed with the terminals T100 and T200 housed and held at the regular position in the male connector 10 and the female connector 20.

As illustrated in FIG. 9A, the front side of the male connector 10, that is the projecting end 13A of the hood portion 13, is positioned opposite the front side of the female connector 20, that is the opening end of the engagement cylindrical portion 23, and the male connector 10 and the female connector 20 are brought toward one another. First, the guide projection portion 31 is brought into contact with the opening end of the engagement cylindrical portion 23, the distal end tapered surface 31T of the distal end of the guide projection portion 31 is guided to the cylindrical portion tapered surface 23T of the opening end of the engagement cylindrical portion 23, particularly the groove portion tapered surface 40T, and the male connector 10 is guided to a position opposite the female connector 20. In this manner, by first inserting the guide projection portion 31 in the groove portion 40, the male connector 10 and the female connector 20 can be positioned relative to one another and also an incorrect engagement of the connectors can be avoided (incorrect engagement prevention).

Figure 9B:
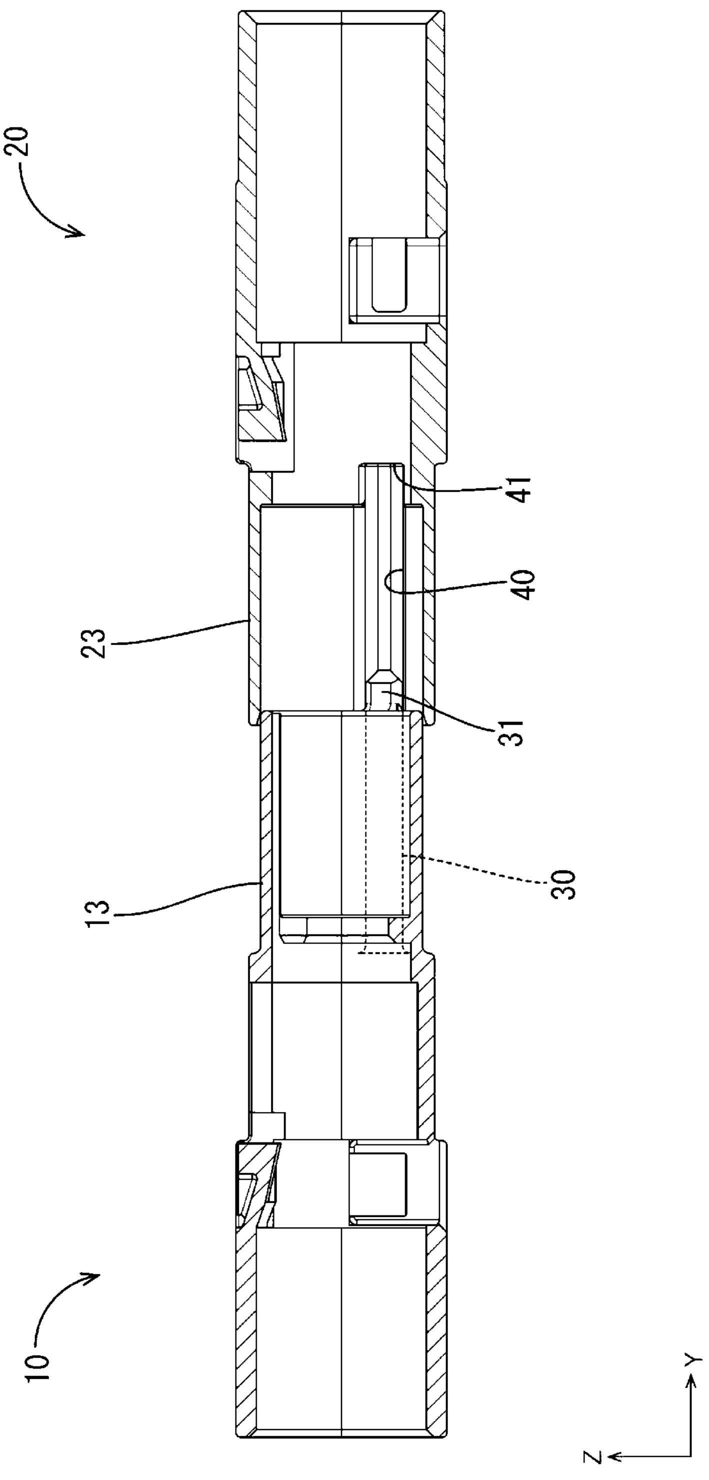
FIG. 9B is a side cross-sectional view illustrating the male connector and the female connector when being engaged at a point after that illustrated in FIG. 9A.

As illustrated in FIG. 9B, from a state in which the guide projection portion 31 is inserted into the groove portion 40, next, the male connector 10 is pushed toward the female connector 20, and the hood portion 13 enters, projecting end 13A first, inside the engagement cylindrical portion 23. Here, by the guide projection portion 31 being inserted into the groove portion 40 in advance, the male connector 10 is positioned opposite the female connector 20 and the rib 30 extending in the front-and-back direction (insertion direction of the hood portion 13) contiguous with the guide projection portion 31 is guided along the groove portion 40. In this manner, the hood portion 13 is smoothly inserted into the engagement cylindrical portion 23. Even in a case of slight misalignment or the like, because the projecting end tapered surface 13T of the hood portion 13 is guided by the cylindrical portion tapered surface 23T of the engagement cylindrical portion 23 (see FIG. 9A), the hood portion 13 is guided into the engagement cylindrical portion 23.

Figure 9C:
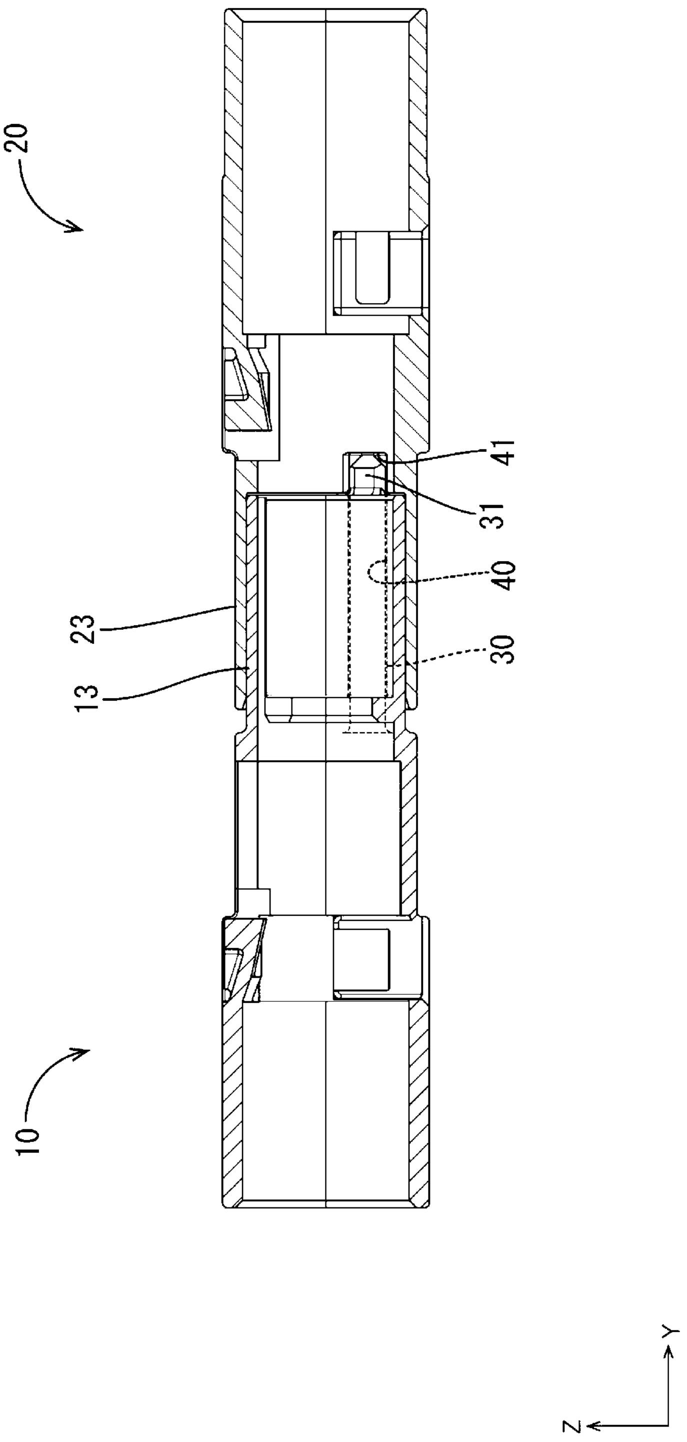
FIG. 9C is a side cross-sectional view illustrating the male connector and the female connector when engagement is complete.

As illustrated in FIG. 9C, when the hood portion 13 is pushed to the back of the engagement cylindrical portion 23, the guide projection portion 31 is received by the recess portion 41, thus completing the engagement operation. Here, the rib 30 of the hood portion 13 extending in the front-and-back direction is guided along the groove portion 40, allowing the male connector 10 to be smoothly pushed to the back of the female connector 20 while rotation of the male connector 10 and the like is suppressed.

As described above, when the hood portion 13 of the male connector 10 is fitted into the engagement cylindrical portion 23 of the female connector 20, as illustrated in FIG. 2, the terminals T100 and T200 housed inside the male connector 10 and the female connector 20 are electrically connected. As described above, in the connector assembly 1 according to the present embodiment, the male connector 10 and the female connector 20 are locked in an engaged state by a lock structure provided on the frame attached to each connector.

Effect of Present Embodiment

Next, the effects of the present embodiment will be described.

The male connector 10 of the present embodiment is a male connector 10 including a hood portion 13 with a cylindrical shape that is fit into, from the projecting end 13A side, the engagement cylindrical portion 23 formed as the opening of the female connector 20. The hood portion 13 is provided with the at least one guide projection portion 31 projecting forward beyond the projecting end 13A with an annular shape.

According to the male connector 10 of the present embodiment, the hood portion 13 is guided into the engagement cylindrical portion 23 by the guide projection portion 31, enabling easy engagement. Also, by adjusting the projection length of the guide projection portion 31, the guide length can be discretionarily set. In this manner, because guiding can be performed without using another member (for example, a female frame holding the female connector 20) of the connector assembly 1, terminals with different external shapes can be used in the connector assembly 1 by just changing the shape of the male connector 10 and the female connector 20.

Note that the male connector 10 according to the present disclosure is preferably applied to a male connector that houses a coaxial terminal, for example. Coaxial terminals have various external shapes and may be used in the present disclosure because such a change in shape can be easily supported.

Also, in the male connector 10 of the present embodiment, the outer circumferential surface of the hood portion 13 is provided with the rib 30 extending in the projection direction (front-and-back direction) of the hood portion 13. The guide projection portion 31 is disposed on the front end of the rib 30.

According to the male connector 10 with such a configuration, because of the rib 30, the strength of the hood portion 13 is improved and the hood portion 13 can be smoothly and easily inserted into the engagement cylindrical portion 23 to the back.

Note that in the male connector 10 of the present embodiment, the plurality of ribs 30 and guide projection portions 31 are provided at positions that are point symmetrical with respect to the center of the hood portion 13 when viewed from the front.

According to this configuration, by providing the plurality of guide projection portions 31 are positions distanced from one another, the hood portion 13 can be more reliably guided into the engagement cylindrical portion 23. Also, because the plurality of ribs 30 are provided at positions distanced from one another, an effect from the ribs 30 of improving the strength can be obtained in a wide range of the hood portion 13.

Also, in the male connector 10 of the present embodiment, the hood portion 13 includes the predetermined thickness portion 13B formed with a predetermined wall thickness and the thin portion 13C formed with a wall thickness less than that of the predetermined thickness portion 13B. The rib 30 is disposed at a position adjacent to the thin portion 13C.

According to the male connector 10 with such a configuration, in the hood portion, the rib 30 reinforces the region near the thin portion 13C which is less strong than the predetermined thickness portion 13B. As a result, the male connector 10 can be made compact, allowing the connector assembly 1 to be made compact.

Note that in the male connector 10 according to the present embodiment, the rib 30 is formed projecting from a region near the thin portion 13C in the direction of a tangent line of the hood portion 13 of the center of the thin portion 13C when viewed from the front surface. According to this configuration, a particularly strong reinforcing effect can be obtained due to the rib 30.

Also, the connector assembly 1 according to the present embodiment is a connector assembly 1 provided with the male connector 10 and the female connector 20 including the engagement cylindrical portion 23 with a cylindrical shape that the hood portion 13 fits into. The inner circumferential surface of the engagement cylindrical portion 23 is provided with the recess portion 41 that receives and houses the guide projection portion 31 of the male connector 10.

According to the connector assembly 1 of the present embodiment, by adjusting the depth of the recess portion 41 and the projection length of the guide projection portion 31, the dimensions of the connector assembly 1 when engaged can be made as small as possible. Also, incorrect connection can be prevented by appropriately designing various connectors in terms of the position, shape, and dimensions of the guide projection portion 31 and the recess portion 41.

Also, the connector assembly 1 according to the present embodiment is a connector assembly 1 provided with the male connector 10 according to the present disclosure and the female connector 20 including the engagement cylindrical portion 23 with a cylindrical shape that the hood portion 13 fits into. The inner circumferential surface of the engagement cylindrical portion 23 is provided with the recess portion 41 that receives and houses the guide projection portion 31 of the male connector 10 and the groove portion 40 that receives and houses the rib 30.

According to the connector assembly 1 of the present embodiment, the groove portion 40 formed on the inner circumference side surface of the engagement cylindrical portion 23 functions as a guide, allowing the hood portion 13 to be smoothly guided to the back of the engagement cylindrical portion 23.

Also, in the connector assembly 1 of the present embodiment, the distal end tapered surface 31T (tapered surface) is formed on the distal end of the guide projection portion 31 and the cylindrical portion tapered surface 23T (tapered surface) is formed on the opening end of the engagement cylindrical portion 23.

According to the connector assembly 1 with such a configuration, because of the distal end tapered surface 31T and the cylindrical portion tapered surface 23T, the guide projection portion 31 can be smoothly guided into the engagement cylindrical portion 23. Also, because of the tapered surfaces, the rib 30 contiguous with the guide projection portion 31 can be guided into the groove portion 40 of the engagement cylindrical portion 23. Note that in the present embodiment, the projecting end 13A of the hood portion 13 is also provided with the projecting end tapered surface 13T. This allows the hood portion 13 to be more easily inserted into the engagement cylindrical portion 23.

Also, in the connector assembly 1 of the present embodiment, the female connector 20 includes the female side lance 27 (lance) capable of bending and deforming that stops the second terminal T200 (terminal) housed inside the engagement cylindrical portion 23, and the recess portion 41 is disposed in the region near the female side lance 27.

In the connector, because the region near the lance allows for bending and deformation, the region is designed to have a higher strength than other regions. According to the connector assembly 1 of the present embodiment, because the recess portion 41 is disposed at a portion of the female connector 20 with a relatively high strength, the effects of a decrease in strength due to the recess portion 41 are kept small.

OTHER EMBODIMENTS

The present disclosure is not limited to the embodiments described above with reference to the drawings, and, for example, the following embodiments are also included in the technical scope of the technology disclosed in the present specification.

(1) In the embodiment described above, two ribs of the guide projection portion are formed on the hood portion and two groove portions contiguous with the recess portions are formed on the engagement cylindrical portion. However, the number of guide projection portions and ribs and the number of recess portions and groove portions are discretionary. One may be used or three or more may be used. In a case in which a plurality are used, they are preferably provided at positions that have point symmetry with respect to the center when viewed from the front. Also, in a case in which a plurality of ribs and groove portions are used, the guide projection portion does not need to be formed on the distal end of all of the ribs, and the recess portion does not need to be formed on the back end of all of the groove portions.

(2) In the embodiment described above, the male connector and the female connector each house one terminal. However, no such limitation is intended. The male connector and the female connector may each house a plurality of terminals. The terminals housed in the male connector and the female connector are not limited to coaxial terminals as described in the embodiment and terminals of various shapes may be used.

(3) In the embodiment described above, the hood portion of the male connector has a roughly cylindrical shape, the inside has a cylindrical shape with a cylindrical cavity formed therein, the engagement cylindrical portion of the female connector has an external shape that is roughly a rectangular parallelepiped, and the inside has a polygonal prism-like shape with a cylindrical cavity formed therein. However, these are merely examples, and the hood portion and the engagement cylindrical portion may be formed with a tube-like shape different from that described above. For example, the engagement cylindrical portion may also be formed with a roughly cylindrical external shape, with the inside having a cylindrical shape with a cylindrical cavity formed therein.

(4) The male side body portion and the female side body portion may have shapes different from that described in the embodiment described above. Also, in the embodiment described above, the retainer is mounted in the male side body portion and the female side body portion, but the configuration is not limited thereto. The male connector and the female connector according to the embodiment described above do not include a lock structure, as it is assumed that the frames that hold the two connectors is provided with a lock structure. However, no such limitation is intended, and a lock structure for locking together the male connector and the female connector in an engaged state may be formed on the male connector and the female connector.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A male connector comprising: a hood portion with a cylindrical shape that is fit into, from a projecting end side, an engagement cylindrical portion formed as an opening on a female connector, wherein the hood portion is provided with at least one guide projection portion projecting forward beyond the projecting end with an annular shape; wherein an outer circumferential surface of the hood portion is provided with a rib extending in a projection direction of the hood portion; and the guide projection portion is formed on a front end of the rib; wherein the hood portion includes a predetermined thickness portion formed with a predetermined wall thickness and a thin portion formed with a wall thickness less than that of the predetermined thickness portion; and the rib is disposed at a position adjacent to the thin portion.

2. A connector assembly comprising: the male connector according to claim 1; and the female connector including the engagement cylindrical portion with a cylindrical shape that the hood portion fits into, wherein an inner circumferential surface of the engagement cylindrical portion is provided with a recess portion that receives and houses the guide projection portion of the male connector.

3. A connector assembly comprising: the male connector according to claim 1; and a female connector including an engagement cylindrical portion with a cylindrical shape that the hood portion fits into, wherein an inner circumferential surface of the engagement cylindrical portion is provided with a recess portion that receives and houses the guide projection portion of the male connector and a groove portion that receives and houses the rib.

4. The connector assembly according to claim 3, wherein a tapered surface is formed on a distal end of the guide projection portion and an opening end of the engagement cylindrical portion.

5. The connector assembly according to claim 3, wherein the female connector includes a lance capable of bending and deforming that stops a terminal housed inside the engagement cylindrical portion; and the recess portion is disposed in a region near the lance.

* * * * *